United States Patent [19]

Sakaguchi et al.

[11] Patent Number: 4,523,802
[45] Date of Patent: Jun. 18, 1985

[54] UNITARY MOUNTING STRUCTURE FOR SEMICONDUCTOR LASER AND OPTICAL FIBER

[75] Inventors: Haruo Sakaguchi, Tanashi; Norio Seki, Tokyo; Shu Yamamoto, Chofu; Akira Okada, Tokyo, all of Japan

[73] Assignee: Kokusai Denshin Denwa Kabushiki Kaisha, Tokyo, Japan

[21] Appl. No.: 347,061

[22] Filed: Feb. 8, 1982

[30] Foreign Application Priority Data

Feb. 19, 1981 [JP] Japan ............... 56-22201

[51] Int. Cl.³ .............................. G02B 5/14
[52] U.S. Cl. .................. 350/96.12; 350/96.11; 350/96.20
[58] Field of Search ............ 350/96.20, 96.12, 96.17, 350/96.11; 156/293

[56] References Cited

U.S. PATENT DOCUMENTS 4,030,811 6/1977 Khoe et al. ............... 350/96.17
4,296,998 10/1981 Dufft ..................... 350/96.17 X

OTHER PUBLICATIONS

IBM Technical Disclosure Bulletin, Optical Fiber--Waveguide Coupler, Lynch, vol. 21, No. 10, Mar. 1979.
Electrical Communication Laboratories, NTT, Yokosuka, Japan, Sep. 19, 1980, Kuwahara et al.

*Primary Examiner*—William L. Sikes
*Assistant Examiner*—Akm E. Ullah

*Attorney, Agent, or Firm*—Robert E. Burns; Emmanuel J. Lobato; Bruce L. Adams

[57] ABSTRACT

A mount arrangement of a semiconductor laser and an optical fiber as a unitary structure. A substrate has a submount disposed thereon mounting a semiconductor laser. The laser is fixed on the submount by a fusion-welding material. A fiber submount is disposed on the substrate in the vicinity of the semiconductor laser submount. An optical fiber is fixed to the fiber submount with its optical axis coaxial with the optical axis of the output light of the semiconductor laser. The fiber submount includes a material for fixing the optical fiber and has a melting point such that it will not affect the coaxial optical alignment of the semiconductor laser and the optical fiber and the fixing between the substrate, the laser submount and between the laser submount and semiconductor laser during fabrication. The thickness of the semiconductor laser submount and the fiber submount are selected in terms of the interrelation between the coefficients of linear thermal expansion of the materials forming them and the coefficient of linear thermal expansion of the optical fiber from the substrate, which are caused by temperature variations in a range including temperature variations during fabrication, are substantially equal to each other and displacement between the optical axes of the light output of the laser and optical fiber is avoided. The retention of the axes coaxial alignment minimizes reduction of the efficiency of the coupling of the optical fiber to the semiconductor laser.

7 Claims, 7 Drawing Figures

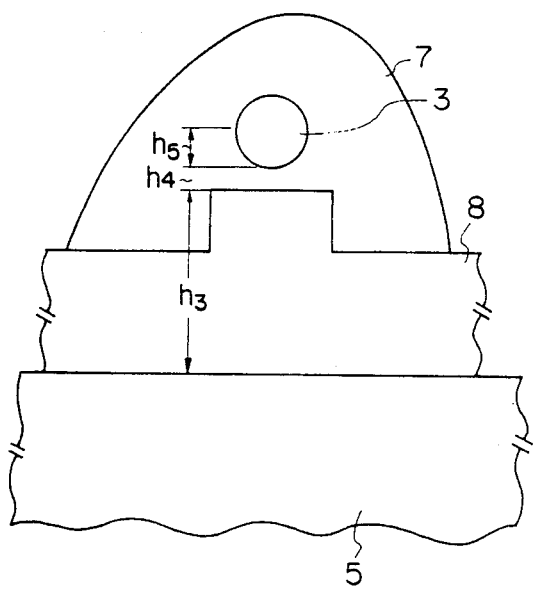
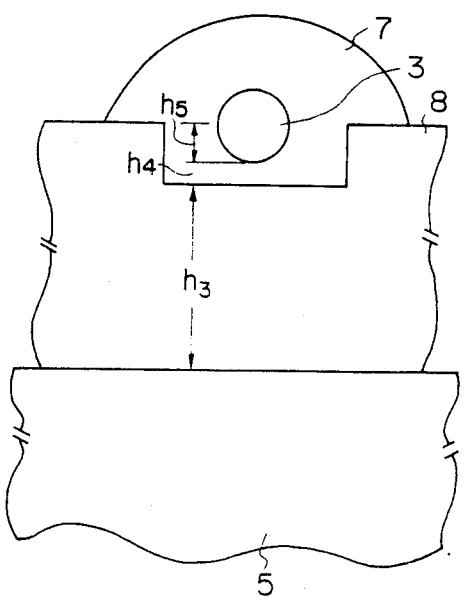
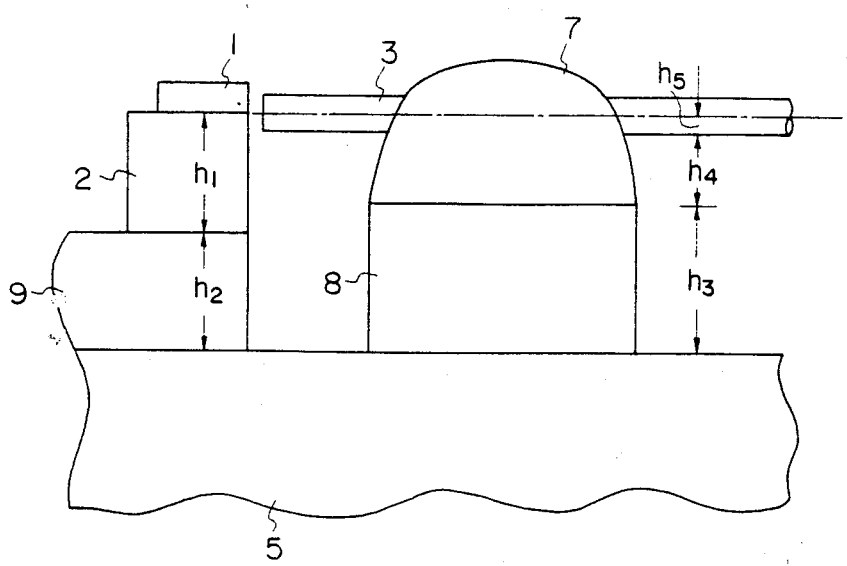

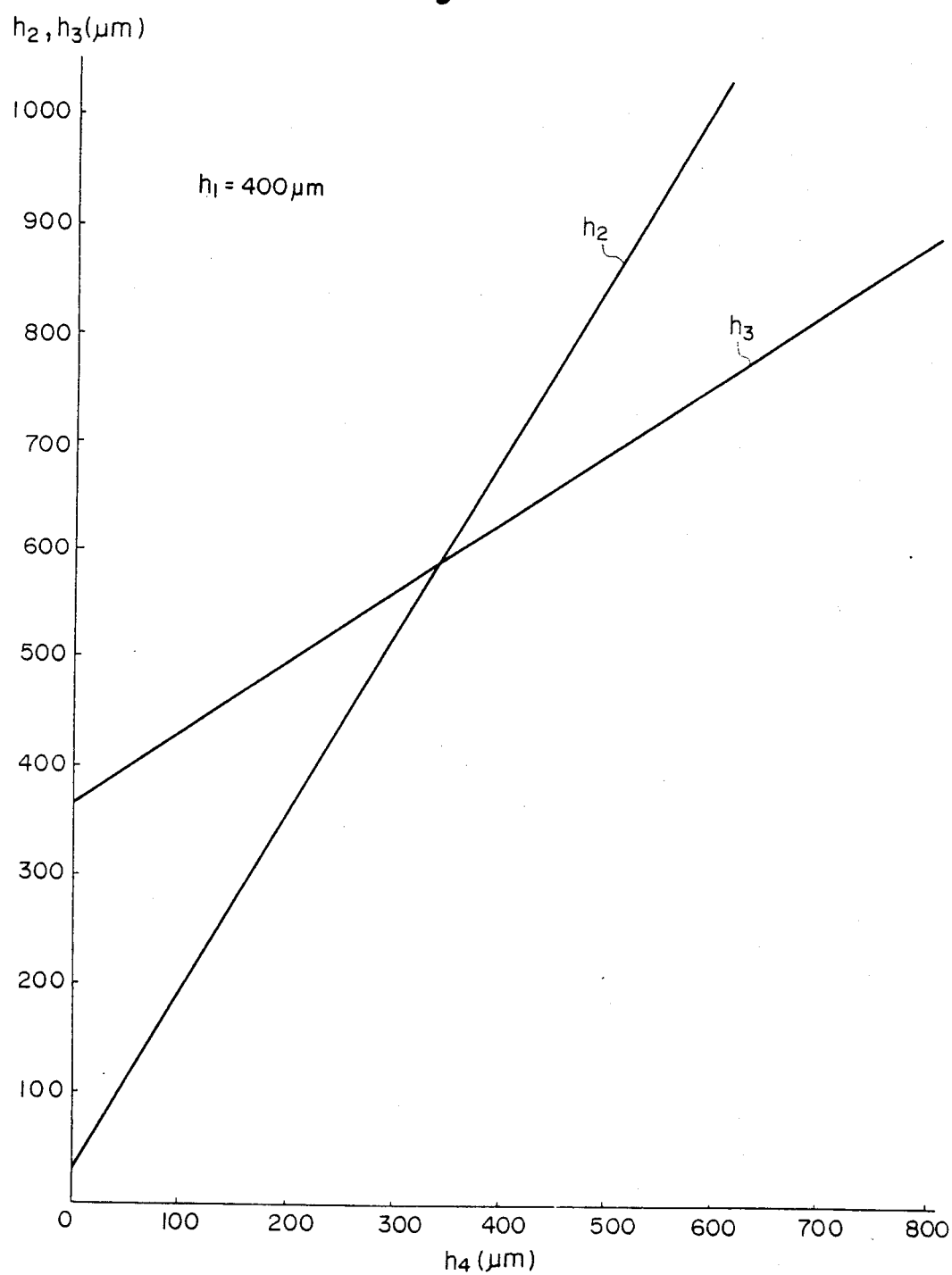

UNITARY MOUNTING STRUCTURE FOR SEMICONDUCTOR LASER AND OPTICAL FIBER

BACKGROUND OF THE INVENTION

The present invention relates to a structure for mounting a semiconductor laser (LD) and an optical fiber (hereinafter referred to simply as a fiber) as a unitary structure.

Heretofore, there has been employed such an LD mounting structure in which diamond of the most excellent thermal conductivity is used as a submount of an LD for its heat removal and the submount is mounted on a metal substrate such as of copper which has excellent in thermal and electrical characteristics. In conventional structures, the coupling efficiency between the LD and the fiber was relatively low.

BRIEF SUMMARY OF THE INVENTION

An object of the present invention is to provide a unitary structure for an LD and an optical fiber which overcomes the abovesaid defect, prevents substantial variations in the coupling efficiency resulting from temperature changes and maintains a stable coupling system for a long period of time.

To achieve the above object, the present invention is provided with a substrate for mounting thereon an LD and a fiber, an LD submount of at least one layer interposed between the substrate and the LD, and a fiber mount of at least one layer interposed between the substrate and the fiber. The thicknesses of the LD submount and the fiber mount are selected to be of required values in view of the relationship between their inherent coefficients of linear thermal expansion so that no axis deviation may occur between the LD and the fiber even if temperature varies.

BRIEF DESCRIPTION OF THE DRAWINGS

The present invention will be hereinafter described in detail with reference to the accompanying drawings, in which:

FIGS. 2, 3, 4A, 4B and 5 are side views illustrating embodiments of the present invention; and FIG. 6 is a graph showing the requirements for the embodiment of FIG. 5.

DETAILED DESCRIPTION

Figure 1:
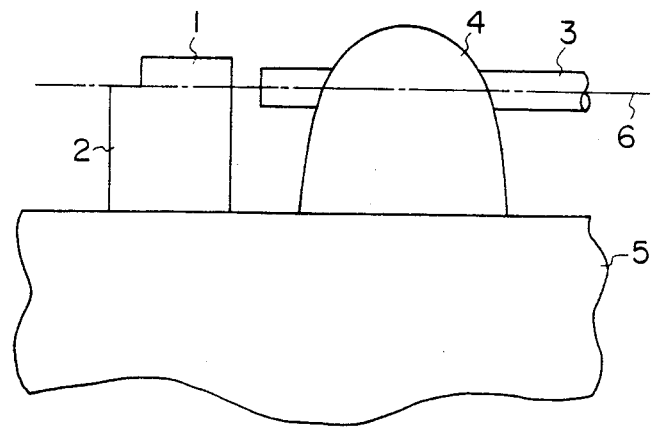
FIG. 1 is a side view showing a prior art example.

With reference to FIG. 1, a conventional example of such an arrangement for mounting an LD and a fiber as a unitary structure with each other will first be described. In FIG. 1, an LD (chip) 1 is fusion-welded to a substrate 5 as of copper through a LD submount 2 formed of diamond, silicon or the like. A fiber 3 is fixed by an adhesive binder 4 after being center aligned with an optical axis 6 of the LD 1. By the way, since the coefficients of linear thermal expansion of the submount 2 and the adhesive binder 4 usually differ from each other, the optical axes of the LD 1 and the fiber 3 deviate from each other due to temperature variations, reducing the coupling efficiency between the LD 1 and the fiber 3. In addition, the adhesive binder 4 is likely to expand and contract with the lapse of time even if placed under constant temperature conditions. In this case, the coupling efficiency between the LD 1 and the fiber 3 also decreases.

Figure 2:
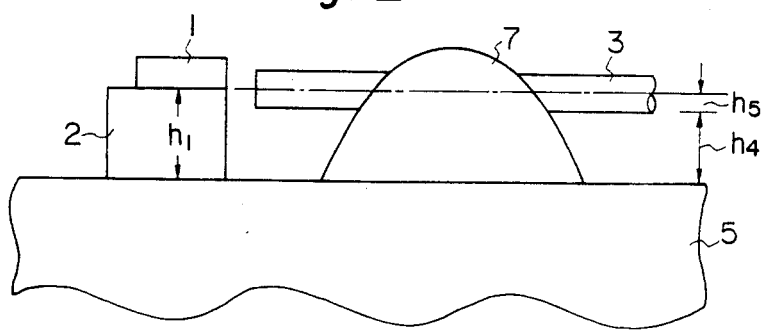

FIG. 2 illustrates an embodiment of the present invention. In this embodiment, the LD (chip) 1 is fusion-welded to the substrate 5 through the LD submount 2. On the other hand, the fiber 3 is fixed by a fixing material 7 after being center aligned with the LD 1. The fixing material 7 is a material the coefficient of linear thermal expansion of which does not change with the lapse of time, such as, for example, solder. In such a case, the surface of the fiber 3 is metallized in advance, for example, with a thin copper film for soldering. Now, letting the coefficients of linear thermal expansion of the LD submount 2, the fixing material 7 and the fiber 3 be represented by $\beta_1$, $\beta_4$ and $\beta_5$, respectively, and letting their thicknesses be represented by $h_1$, $h_4$ and $h_5$, respectively, the following expression (1) is obtained as a requirement for axis alignment of the LD 1 and the fiber 3 at a certain reference temperature:

$$h_1 = h_4 + h_5 \tag{1}$$

Further, in order to make mutually equal the axis deviations of the LD 1 and the fiber 3 which result from temperature variations from the reference temperature, it is necessary that the requirement of the following expression be fulfilled at all times.

$$\beta_1 h_1 = \beta_4 h_4 + \beta_5 h_5 \tag{2}$$

Finding $h_1$ and $h_4$ from the expressions (1) and (2), the following expressions (3) and (4) are obtained:

$$h_1 = \frac{\beta_4 - \beta_5}{\beta_4 - \beta_1} h_5 \tag{3}$$

$$h_4 = \frac{\beta_1 - \beta_5}{\beta_4 - \beta_1} h_5 \tag{4}$$

If it is assumed to use diamond ($\beta_1 = 1.1 \times 10^{-6}$ deg$^{-1}$) as the submount 2, ordinary solder (Sn 60%, Pb 40%, $\beta_4 = 26.3 \times 10^{-6}$ deg$^{-1}$) as the fixing material 7 and an ordinary silica fiber ($\beta_5 = 0.35 \times 10^{-6}$ deg$^{-1}$, $h_5 = 62.5$ μm) as the fiber 3, then $h_1 = 64.36$ μm and $h_4 = 1.86$ μm are obtained. By selecting the thickness $h_1$ of the LD submount and fixing the LD 1 and the fiber 3 with their axes aligned with each other as described above, a coupling system can be obtained which is free from variations in its coupling efficiency by temperature deviations. In practice, however, there are some occasions where it is difficult to set the thicknesses $h_1$ and $h_4$ as described above or where the thickness $h_4$ is too small to fix the fiber 3 to the substrate 5. This can be improved by inserting between the fixing material 7 and the substrate 5 a fiber submount 8 of a material which has a coefficient of linear thermal expansion $\beta_3$ smaller than at least that $\beta_4$ of the fixing member 7. Letting the thickness of the fiber submount 8 be represented by $h_3$, the following expressions (5) and (6) can be obtained in correspondence to the aforesaid expressions (1) and (2):

$$h_1 = h_3 + h_4 + h_5 \tag{5}$$

$$\beta_1 h_1 = \beta_3 h_3 + \beta_4 h_4 + \beta_5 h_5 \tag{6}$$

From the expressions (5) and (6), $h_3$ and $h_4$ are obtained as given by the following expressions (7) and (8):

$$h_3 = \frac{\beta_1 - \beta_4}{\beta_3 - \beta_4} h_1 - \frac{\beta_5 - \beta_4}{\beta_3 \beta_4} h_5 \tag{7}$$

-continued $$h_4 = \frac{\beta_1 - \beta_3}{\beta_4 - \beta_3} h_1 - \frac{\beta_5 - \beta_3}{\beta_4 - \beta_3} h_5 \qquad (8)$$

Since $\beta_4 > \beta_1$ in general, it is effective for increasing the thickness $h_4$ that a material of a small coefficient of linear thermal expansion is used for the fiber submount 8. Now, let it be assumed that silica glass ($\beta_3 = 0.35 \times 10^{-6}$ deg$^{-1}$) is employed for the fiber mount. For example, in case of employing diamond as the LD submount 2, solder as the fixing material 7 and a silica fiber as the fiber 3 as in the case of FIG. 2, there can be obtained from the expressions (7) and (8) $h_3 = 0.971 h_1 - 62.5$ and $h_4 = 0.029 h_1$, where the unit is $\mu$m. By a suitable selection of the thickness $h_1$ of the LD submount 2 within the range in which to satisfy the requirement $h_1 > 64.37$ $\mu$m obtainable from the requirement $h_3 > 0$, the thicknesses $h_3$ and $h_4$ are determined uniquely. For instance, when $h_1 = 400$ $\mu$m, it is determined that $h_3 = 325.90$ $\mu$m and that $h_4 = 11.6$ $\mu$m. In the event that the thickness $h_4$ of the fixing material 7 between the fiber 3 and the fiber mount 8 is not large enough to fix the fiber 3 thereon, the fiber fixing force can be increased by cutting the fiber submount 8 into a convex or concave shape to increase the contact area between the fixing material 7 and the fiber submount 8, as depicted in FIGS. 4A and 4B in which the fiber fixing portion is viewed from the direction of the fiber axis.

By the way, in a case where the value of the thickness $h_4$ is small and an error $\Delta h_3$ in the thickness $h_3$ dependent on the fabricating tolerance of the fiber submount 8 exceeds the thickness $h_4$, alignment of the LD 1 and the fiber 3 relative to each other is impossible. A description will hereinbelow be given of a structure for avoiding it.

Figure 3:
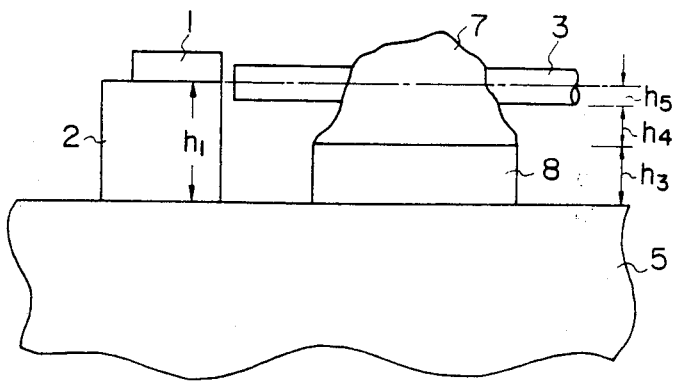

FIG. 5 illustrates an embodiment of such a structure; which differs from the embodiment of FIG. 3 in that a mount 9 of a material having a coefficient of linear thermal expansion larger than at least the LD submount 2 is interposed between the LD submount 2 and the substrate 5. Of course, the mount 9 may also be of the same material as the substrate 5 and, in such a case, this can easily be achieved by cutting the substrate 5 to provide therein a level difference $h_2$.

This embodiment is characterized in that it is arranged so that temperature deviations would not cause any axis deviation between the LD 1 and the fiber 3 on account of the equilibrium of the coefficient of linear thermal expansion and the thicknesses of the LD submount 2, the mount 9 between the LD submount 2 and the substrate 5, the fiber submount 8 and the fixing material 7. From the requirement for the axis alignment of the LD 1 and the fiber 3, the following expression (9) is obtained.

$$h_1 + h_2 = h_3 + h_4 + h_5 \qquad (9)$$

Further, the following expression (10) is obtained from the requirement for making mutually equal the axis deviations of the LD 1 and the fiber 3 which are caused by temperature changes.

$$\beta_1 h_1 + \beta_2 h_2 = \beta_3 h_3 + \beta_4 h_4 + \beta_5 h_5 \qquad (10)$$

where $\beta_2$ is the coefficient of linear thermal expansion of the mount 9 and $h_2$ is the thickness of the mount 9. Finding $h_2$ and $h_3$ from the expressions (9) and (10), the following expressions (11) and (12) are obtained:

$$h_2 = \frac{\beta_3 - \beta_1}{\beta_2 - \beta_3} h_1 + \frac{\beta_4 - \beta_3}{\beta_2 - \beta_3} h_4 - \frac{\beta_3 - \beta_5}{\beta_2 - \beta_3} h_5 \qquad (11)$$

$$h_3 = \frac{\beta_2 - \beta_1}{\beta_2 - \beta_3} h_1 + \frac{\beta_4 - \beta_2}{\beta_2 - \beta_3} h_4 - \frac{\beta_2 - \beta_5}{\beta_2 - \beta_3} h_5 \qquad (12)$$

Now, in case of employing diamond as the LD submount 2, a silica fiber as the fiber 3, solder as the fixing material 7, silicon ($\beta_3 = 2.5 \times 10^{-11}$ deg$^{-1}$) as the fiber submount 8 and copper ($\beta_2 = 16.8 \times 10^{-6}$ deg$^{-1}$) as the mount 9, the thicknesses $h_2$ and $h_3$ are such as given by the following expressions (13) and (14):

$$h_2 = 0.098 h_1 + 1.664 h_4 - 9.397 \qquad (13)$$

$$h_3 = 1.098 h_1 + 0.664 h_4 - 71.897 \qquad (14)$$

FIG. 6 shows the thicknesses $h_2$ and $h_3$ obtained from the expressions (13) and (14) when $h_1$ 32 400 $\mu$m. By giving $h_4$, a set of solutions of $h_2$ and $h_3$ are provided. For instance, letting $h_4 = 500$ $\mu$m, there are obtained a pair of solutions $h_2 = 861.803$ $\mu$m and $h_3 = 699.303$ $\mu$m.

It is considered that the thickness of the LD submount 2, the mount 9, the fiber submount 8 and the fiber 3 (its radius) may in some cases deviate from preset values according to fabricating tolerances. The influence of such deviations will described next. Letting deviations of actual values from the preset values $h_1$, $h_2$, $h_3$ and $h_5$ be represented by $\Delta h_1$, $\Delta h_2$, $\Delta h_3$ and $\Delta h_5$, respectively, the axis alignment of the LD 1 and the fiber 3 can be achieved only by changing the thickness of solder by $h_4 = \Delta h_1 + \Delta h_2 - \Delta h_3 - \Delta h_5$. Next, an axis deviation $\delta$ between the LD and the fiber owing to a temperature variation is given by the following expression (15):

$$\delta = \beta_1(h_1 + \Delta h_1) + \beta_2(h_2 + \Delta h_2) - \beta_3(h_3 + \Delta h_3) - \beta_4(h_4 + \Delta h_4) - \beta_5(h_5 + \Delta h_5) \qquad (15)$$

Using the expression (10), the expression (15) is simplified as follows:

$$\begin{aligned}\delta &= \beta_1 \Delta h_1 + \beta_2 \Delta h_2 - \beta_3 \Delta h_3 - \beta_4 \Delta h_4 - \beta_5 \Delta h_5 \qquad (16) \\ &= (\beta_1 - \beta_4)\Delta h_1 + (\beta_2 - \beta_4)\Delta h_2 \\ &\quad - (\beta_3 - \beta_4)\Delta h_3 - (\beta_5 - \beta_4)\Delta h_5\end{aligned}$$

Here, $\Delta h_4 = \Delta h_1 + \Delta h_2 - \Delta h_3 - \Delta h_5$ is used. In case of employing diamond for the LD submount 2, copper for the mount 9, a silica fiber as the fiber 3 and silicon for the fiber submount 8 in FIG. 5, it is possible to realize $|\Delta h_1| = 20$ $\mu$m, $|\Delta h_2| = 10$ $\mu$m, $|\Delta h_3| = 10$ $\mu$m and $|\Delta h_5| = 1.5$ $\mu$m. A worst value $|\delta|_{max}$ of $|\delta|$ in this case in on the order of $$|\delta|_{max} = 8.759 \times 10^{-4} \text{ deg}^{-1} \mu\text{m},$$

which does not matter in practical use. Further, in connection with a temperature change at the time of fixing the bider 3 to the fiber submount 8, if a maximum difference between the solder melting temperature and room temperature is assumed to be 200 deg, $|\delta|_{max} = 0.1752$ $\mu$m and the axis deviation is sufficiently small, exerting a substantially no influence on the coupling efficiency between the LD 1 and the fiber 3. The axis alignment of the LD 1 and the fiber 3 is conducted while melting the solder 7 (at 185° to 195° C.) by heating the coupling system as a whole. In this case, the LD 1 may be degraded when applying a current to the LD 1 to oscillate it. In such a case, the axis alignment can be achieved by applying light from a separate light source into the fiber 3 in advance and disposing an emitting end face of the fiber opposite to the LD 1 and monitoring an optical output from the opposite end face of the LD 1.

Moreover, by fusion-welding the LD 1 to the LD submount 2, the LD submount 2 to the mount 9 and the fiber submount 8 to the substrate 5, through the use of a fusion-welding material having a melting temperature higher than the solder, it is possible to prevent the LD 1, the LD submount 2 and the fiber submount 8 from falling out of the substrate 8 during the axis alignment operation while melting the solder.

The foregoing description has been given without regard to the thicknesses of the fusion-welding material between the LD 1 and the LD submount 2, between the submount 2 and the mount 9 and between the fiber submount 8 and the substrate 5 and without regard to the height of an active layer of the LD 1 from the surface of the LD 1 on the side of the submount 2 (the height being on the order of 2 to 3 μm in an ordinary LD). Strictly speaking, however, by adding their effects to the aforementioned expressions (9) and (10) to obtain a new set of solutions, it is possible to realize a coupling system which is free from axis deviations by temperature changes; but the fusion-welding material is usually so thin that its influence is sufficiently negligible.

As has been described above in detail, in accordance with the present invention, by selecting the thicknesses and thermal coefficients of an LD submount, a mount for the LD submount, a fiber mount and a fixing material to be of required values, it is possible to obtain a stable coupling system in which the coupling efficiency between an LD and a fiber does not vary with temperature. Therefore, the present invention is of great utility in industrial use. Moreover, the present invention produces a similar effect not only in setting up an LD and a fiber as a unitary structure with each other but also in assembling an LD and an optical waveguide, an optical waveguide and a fiber or optical waveguides as one body. Moreover, even if another optical system is interposed between the LD and the fiber, the same results as described in the foregoing can be obtained. Furthermore, solder is employed as the fixing material in the foregoing, but it is also possible to use an adhesive binder if it is free from aging.

What we claim is:

1. A unitary structure for a semiconductor laser and an optical fiber, comprising: a substrate; a semiconductor laser submount, a mount for the submount disposed on the substrate; a semiconductor laser fixed by a fusion-welding material on the semiconductor laser submount; a fiber submount disposed on a substrate in the vicinity of the semiconductor laser mount and submount; and an optical fiber fixed to the fixed submount disposed to be coupled coaxially with output light of the semiconductor laser; the fiber submount including a fixing material stable over time having a melting point effective to not affect the fixedness stability between the substrate and the semiconductor laser submount and between the semiconductor laser submount and the semiconductor laser, the thicknesses of the semiconductor laser mount and submount and the fiber submount and fixing material being selected in terms of the interrelation between substantially common coefficients of linear thermal expansion of materials forming them and the coefficient of linear thermal expansion of the optical fiber so that expansion deviations of the semiconductor laser and the optical fiber from the substrate caused by temperature variations in a range including temperature variations in manufacturing steps are substantially equal to each other and effective to substantially reduce misalignment of the coaxial axes of the optical fiber and the output light of the semiconductor laser, and thereby minimize lowering of the coupling efficiency between the semiconductor laser and the optical fiber.

2. A unitary structure for a semiconductor laser and an optical fiber according to claim 1, wherein the fiber submount is composed of the fixing material alone.

3. A unitary structure for a semiconductor laser and an optical fiber according to claim 1, wherein the fiber submount is composed of a material having a coefficient of linear thermal expansion smaller than that of the fixing material.

4. A unitary structure for a semiconductor laser and an optical fiber according to claim 1, wherein the semiconductor laser submount is formed as a two-layer structure, and wherein one of the two layers contacts the substrate and is formed of a material having a coefficient of linear thermal expansion larger than that of the other layer.

5. A unitary structure comprising: a substrate; a semiconductor laser submount on the substrate; means for stably fixing the semiconductor laser on the submount; a fiber submount; an optical device of material boundaries for transmitting a beam of electromagnetic energy output fixed on the fiber submount and disposed to be coupled coaxially with a beam of output light of the semiconductor laser, the fiber submount including a fixing material stable over time for fixing said optical device thereto and having a melting point effective to not affect the fixedness stability between the substrate and the semiconductor laser submount and between the semiconductor laser the thicknesses of the semiconductor laser submount, the fiber submount and the fixing material being selected in terms of the interrelation between the substantially common coefficients of linear thermal expansion of the materials forming them and the coefficient of linear thermal expansion of the optical device substantially the same as said coefficient so that thermal expansion deviations of the semiconductor laser and the optical device relative to the substrate caused by temperature variations in a range including temperature variations in fabrication steps are substantially equal to each other and effective to minimize misalignment of the coaxial axes of the optical device and of the output light of the semiconductor laser, and thereby minimize lowering of the coupling efficiency between the semiconductor laser and the optical device.

6. A unitary structure comprising; a substrate; a semiconductor laser submount; a mount for said submount on the substrate; a semiconductor laser fixed on said submount; means for stably fixing the semiconductor laser on the submount; a fiber submount disposed on the substrate in the vicinity of the semiconductor laser mount and submount; an optical device of material boundaries for transmitting a beam of light output of the laser and fixed on the fiber submount disposed to be optically coupled coaxially with a beam of output light of the semiconductor laser, the fiber submount including a fixing material for fixing said optical device thereto and having a melting point such that it does not affect the fixedness stability between the substrate and the semiconductor laser submount and between the semiconductor laser submount and the semiconductor laser due to temperature variations, the thicknesses of the semiconductor laser submount and the fiber submount and fixing material being selected in terms of the interrelation between the coefficients of linear thermal expansion of materials forming them and the coefficient of linear thermal expansion of the optical device so that physical expansion deviations of the semiconductor laser and the optical device from the substrate caused by temperature variations in a range including temperature variations during fabrication are substantially equal to each other and effective to minimize misalignment of the coaxial axes of the optical device and of the output light of the semiconductor laser, and thereby minimize lowering of the coupling efficiency between the semiconductor laser and the optical device.

7. A unitary structure according to claim 6, in which the means for stably fixing the semiconductor laser comprises solder.

* * * * *